(12) United States Patent
Knoop

(10) Patent No.: US 12,123,427 B2
(45) Date of Patent: Oct. 22, 2024

(54) TURBOMACHINE, METHOD FOR OPERATING A TURBOMACHINE

(71) Applicant: Robert Bosch GmbH, Stuttgart (DE)

(72) Inventor: Andreas Knoop, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/766,901

(22) PCT Filed: Aug. 27, 2020

(86) PCT No.: PCT/EP2020/073980
§ 371 (c)(1),
(2) Date: Apr. 6, 2022

(87) PCT Pub. No.: WO2021/069143
PCT Pub. Date: Apr. 15, 2021

(65) Prior Publication Data
US 2024/0093695 A1 Mar. 21, 2024

(30) Foreign Application Priority Data
Oct. 7, 2019 (DE) ...................... 10 2019 215 337.2

(51) Int. Cl.
*F04D 29/28* (2006.01)
*F04D 17/10* (2006.01)
(Continued)

(52) U.S. Cl.
CPC ........... *F04D 29/284* (2013.01); *F04D 17/10* (2013.01); *F04D 25/082* (2013.01);
(Continued)

(58) Field of Classification Search
CPC ...... F04D 29/284; F04D 29/266; F04D 17/10; F04D 25/082; F04D 29/0513;
(Continued)

(56) References Cited

U.S. PATENT DOCUMENTS

2020/0355192 A1* 11/2020 Nejedly .............. F04D 29/0516

FOREIGN PATENT DOCUMENTS

| DE | 102014018070 A1 * | 7/2015 | ........... F01D 25/125 |
| DE | 102014018096 A1 * | 7/2015 | ............. F01D 25/22 |

(Continued)

OTHER PUBLICATIONS

Translation of International Search Report for Application No. PCT/EP2020/073980 dated Dec. 2, 2020 (2 pages).

*Primary Examiner* — David E Sosnowski
*Assistant Examiner* — Arthur Paul Golik
(74) *Attorney, Agent, or Firm* — Michael Best & Friedrich LLP

(57) ABSTRACT

The invention relates to a turbomachine (1) for supplying air to a fuel cell system, comprising at least one compressor wheel (3) conjointly connected to a shaft (2), and an electric motor (4) for driving the shaft (2), the compressor wheel (3) being connected via a hub portion (5) to a preferably hollow-cylinder-shaped shaft portion (6) of the shaft (2). According to the invention, at least one air channel (7, 8) is formed in the hub portion (5), by means of which air channel a compressor inlet (9) is connected to an annular space (10) on the side of the compressor wheel (3) facing away from the compressor inlet (9) such that substantially the same air pressure is present on both sides of the compressor wheel (3). The invention further relates to a method for operating a turbomachine (1).

18 Claims, 2 Drawing Sheets

(51) Int. Cl.
  *F04D 25/08*    (2006.01)
  *F04D 29/051*   (2006.01)
  *F02B 39/00*    (2006.01)
  *F04D 29/26*    (2006.01)
  *F04D 29/58*    (2006.01)
  *H01M 8/04111*  (2016.01)

(52) U.S. Cl.
  CPC ........ *F04D 29/0513* (2013.01); *F02B 39/005* (2013.01); *F04D 29/266* (2013.01); *F04D 29/5806* (2013.01); *F04D 29/582* (2013.01); *F04D 29/584* (2013.01); *F04D 29/5846* (2013.01); *H01M 8/04111* (2013.01)

(58) Field of Classification Search
  CPC .. F04D 29/5806; F04D 29/582; F04D 29/584; F04D 29/5846; F02B 39/14; F02B 39/005
  See application file for complete search history.

(56) References Cited

FOREIGN PATENT DOCUMENTS

| | | | | |
|---|---|---|---|---|
| DE | 102015007379 A1 * | 1/2016 | ........... | F01D 25/168 |
| DE | 102017211940 A1 * | 1/2019 | | |
| DE | 102017216763 A1 | 3/2019 | | |
| WO | 2008086826 A1 | 7/2008 | | |

* cited by examiner

TURBOMACHINE, METHOD FOR OPERATING A TURBOMACHINE

BACKGROUND OF THE INVENTION

The invention relates to a turbomachine for supplying air to a fuel cell system, comprising at least one compressor wheel connected to a shaft for conjoint rotation therewith, and an electric motor for driving the shaft, wherein the compressor wheel is connected via a hub portion (5) to a preferably hollow-cylinder-shaped shaft portion of the shaft for conjoint rotation therewith. The turbomachine can be used, in particular, for supplying air to fuel cell systems. In addition, the invention relates to a method for operating a turbomachine of this kind.

Fuel cell systems require oxygen, which reacts with hydrogen to give water or water vapor in a fuel cell of the system. In this way, by electrochemical conversion, electric power is generated, and this can be used as motive power, e.g. to drive a vehicle. The oxygen source is usually ambient air, which is fed to the fuel cell by means of an air compression system since the process requires a certain air mass flow and a certain pressure level. The air compression system comprises a high speed turbomachine having at least one compressor wheel, which is arranged on a shaft and is driven by electric motor. For energy recovery, a turbine wheel, to which fuel cell exhaust air is fed, can be arranged on the shaft. In this case, the turbomachine is an exhaust gas turbocharger with an additional electric motor.

The maximum speed of the additional electric motor is limited for reasons of control and strength, for example to a maximum of between 100,000 and 125,000 rpm. Exhaust gas turbochargers without an additional electric motor reach speeds of between 180,000 and 250,000 rpm. The achievable compressor outlet pressure in a turbomachine is proportional to the square of the peripheral speed at the outside diameter of the compressor wheel. This means that it is determined by the speed and outside diameter of the compressor wheel. The pressures required for the fuel cell system, combined with the abovementioned speed restriction, result in compressor wheels with comparatively large outside diameters. These generate large axial forces in the direction of the compressor inlet since, during operation, the pressure prevailing at the compressor outlet is applied to the wheel back of the compressor wheel. The high axial forces, in turn, require correspondingly large axial bearings. However, as the size of the axial bearings increases, so does the power loss, the axial bearings accounting for a significantly greater proportion (2/3) of the total bearing losses than the radial bearings (1/3).

Turbomachines used to supply air to fuel cell systems generally have foil air bearings in order to keep the system oil-free. However, foil air bearings generate air friction losses and are therefore cooled with the aid of additional air. For this purpose, usually about 5 to 10% of the compressed air is diverted for cooling. This diverted air quantity is subsequently no longer available for the process in the fuel cell and thus diminishes the efficiency of the turbomachine. To enable the diverted air to provide any cooling capacity at all, it is itself cooled beforehand. For this purpose, the cooling air is usually diverted downstream of a charge-air cooler of the fuel cell system. The additional cooling requirement must be taken into account in the design of the charge-air cooler. In addition, an additional line must be provided, by means of which the cooling air can be fed to the turbomachine.

SUMMARY OF THE INVENTION

Proceeding from the aforementioned prior art, it is the underlying object of the present invention to improve the efficiency of a turbomachine for supplying air to a fuel cell system.

The turbomachine proposed for the purpose of supplying air to a fuel cell system, comprises at least one compressor wheel connected to a shaft for conjoint rotation therewith, and an electric motor for driving the shaft, wherein the compressor wheel is connected via a hub portion to a preferably hollow-cylinder-shaped shaft portion of the shaft for conjoint rotation therewith. According to the invention, at least one air channel is formed in the hub portion, by means of which air channel a compressor inlet is connected to an annular space on the side of the compressor wheel facing away from the compressor inlet, thus ensuring that substantially the same air pressure is present on both sides of the compressor wheel. Consequently, the axial forces which act on the compressor wheel cancel each other out completely or almost completely. This means that an axial force balance is effected. This, in turn, has the effect of enabling the power loss in the axial bearings to be reduced. Furthermore, the cooling air requirement in the bearings is reduced. Both lead to an increase in efficiency. In addition, the robustness of the turbomachine with respect to external accelerations is increased, for example during travel on rough roads, if the turbomachine is used in a vehicle.

The hub portion preferably has at least one axially running air channel. This means that the at least one air channel runs parallel to a longitudinal axis of the shaft. The air channel can be designed as an axial bore, for example. If only one axially running air channel is provided, this is preferably arranged centrally or coaxially with respect to the longitudinal axis of the shaft. The at least one axially running air channel is preferably in direct connection with the compressor inlet side, with the result that a partial flow of the air fed to the compressor wheel is diverted via the at least one axially running air channel and is guided to the rear side of the compressor wheel.

As a further preference, the hub portion has at least one substantially radially running air channel. Via the at least one substantially radially running air channel, it is possible to establish a connection between the at least one axially running air channel and the annular space on the rear side of the compressor wheel. The substantially radially running air channel can be formed by a radial bore in the hub portion, for example. The hub portion preferably has a plurality of substantially radially running air channels which are arranged at the same angular spacing from one another. The air guided behind the compressor wheel is thus distributed uniformly in the annular space.

The hub portion is advantageously inserted, in particular pressed, at least in some section into the hollow-cylinder-shaped shaft portion. The interengagement of the portions increases the rigidity and thus the stability of the compound structure.

It is furthermore proposed that the hollow-cylinder-shaped shaft portion has at least one substantially radially running air channel, which is arranged in overlap with the at least one radially running air channel of the hub portion. The at least one substantially radially running air channel of the hub portion can accordingly be arranged in a region which is inserted, in particular pressed, into the hollow-cylinder-shaped shaft portion. In this way, a turbomachine of compact construction in the axial direction is created.

As a development of the invention, it is proposed that the annular space is connected to at least one bearing of the shaft on the side of the compressor wheel facing away from the compressor inlet via at least one further air channel. In this case, the air fed in via the at least one further air channel can be used to cool the at least one bearing. The at least one bearing is preferably designed as a foil air bearing, thus ensuring that the system is free of oil.

The at least one further air channel for connecting at least one shaft bearing to the annular space and thus to the compressor inlet side can furthermore be routed via an annular gap between the shaft and a winding, surrounding the shaft, of the electric motor. In this case, the air fed in via the at least one further air channel can be used to cool the electric motor.

Alternatively or in addition, it is proposed that the at least one further air channel is routed through an internally ventilated axial bearing disk, which is connected to the shaft for conjoint rotation therewith, for supporting a turbine wheel. In addition to cooling of the axial bearing, it is thus possible to achieve a pressure stroke at the same time. This is because it is possible, with the aid of the internally ventilated axial bearing disk, for the air pressure of the air fed in via the at least one further air channel to be raised to the level upstream of the turbine wheel.

Air is sucked in from the environment via the compressor inlet. The air sucked in is thus at ambient temperature and hence at a very low temperature level. It is thus already possible as a rule for the rotor and bearing cooling function to be performed in an optimum manner.

If necessary, however, cooled ambient air, that is to say air which has itself been cooled beforehand, can also be fed to the air channels. According to a preferred embodiment of the invention, therefore, all the air channels which connect the compressor inlet to the rearward annular space and optionally to at least one shaft bearing can be supplied with cooled or uncooled ambient air.

By means of the internally ventilated axial bearing disk, it is possible for the air pressure of the cooled or uncooled ambient air to be raised to the level upstream of the turbine wheel, thus ensuring that at least some of the energy required for the delivery of cooling air is recovered with the aid of the turbine.

One modification consists in dispensing with the pressure stroke due to the internally ventilated axial bearing disk and returning the ambient air to the system downstream of the turbine outlet.

To achieve the object mentioned at the outset, a method for operating a turbomachine according to the invention is also proposed. In the method, at least the air channels which connect the compressor inlet to the rearward annular space are supplied with cooled or uncooled ambient air. The annular space is advantageously connected to at least one bearing via at least one further air channel, and therefore the ambient air is fed to the at least one bearing. In this way, the at least one bearing can be cooled with the aid of the ambient air.

Furthermore, it is proposed that, when the method is carried out with the aid of an internally ventilated axial bearing disk, through which at least one air channel is routed, the cooling air pressure is raised. In this way, at least some of the energy required for delivering the ambient air can be recovered.

BRIEF DESCRIPTION OF THE DRAWINGS

The invention is explained in greater detail below with reference to the appended drawings. In the drawings.

DETAILED DESCRIPTION

Figure 1:
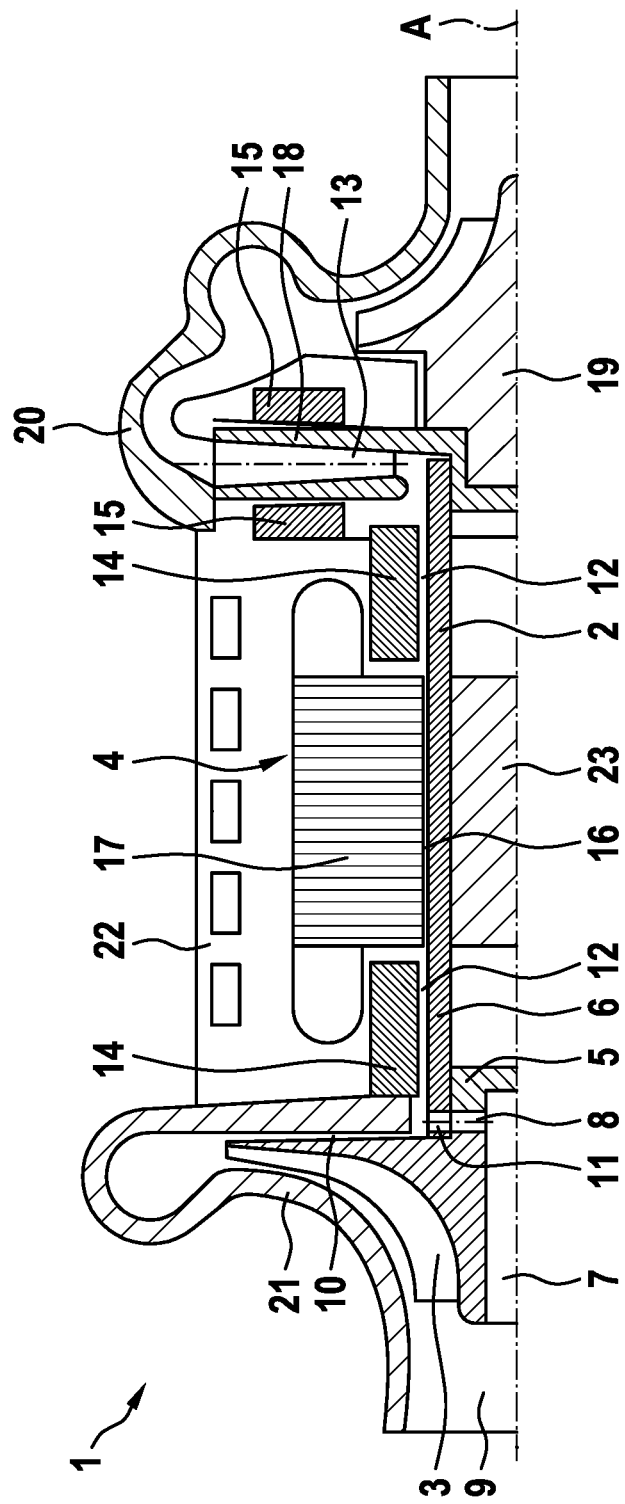
FIG. 1 shows a schematic longitudinal section through a turbomachine according to the invention.

The turbomachine 1 illustrated in FIG. 1 comprises a shaft 2, in which a compressor wheel 3 is arranged at one end and a turbine wheel 19 is arranged at the other end. The shaft 2 is driven in a rotary motion about its longitudinal axis A by means of an electric motor 4. For this purpose, the electric motor 4 comprises a winding 17, which is arranged around the shaft 2, and a permanent magnet 23, which is accommodated in the shaft 2. To enable the shaft 2 to perform a rotary motion, it is rotatably mounted by means of two radial bearings 14. Furthermore, two axial bearings 15 are provided in the region of an axial bearing disk 18 connected to the shaft 2. The bearings 14, 15 are integrated into a motor housing 22 of the electric motor 4. The compressor wheel 3 is surrounded by a compressor housing 21, and the turbine wheel 19 is surrounded by a turbine housing 20.

During operation of the turbomachine 1, air flows to the compressor wheel 3 via a compressor inlet 9. In order to minimize the axial forces acting on the compressor wheel 3 during this process, the compressor wheel 3 of the turbomachine 1 illustrated has a plurality of air channels 7, 8 in a hub portion 5, which is inserted into a hollow-cylinder-shaped shaft portion 6. The air channels 7, 8 connect the compressor inlet 9 to an annular space 10 on the side of the compressor wheel 3 which faces away from the compressor inlet 9. Thus, a partial flow of the air from the compressor inlet 9 is fed to the annular space 10, ensuring that the air pressure is the same in both spaces. As a result, the axial forces acting on the compressor wheel 3 cancel one another out. Accordingly, the bearing losses in the region of the axial bearings 15 are reduced.

Since, in the present case, the radially running air channels 8 are arranged in the region of the hub portion 5, which is inserted into the hollow-cylinder-shaped shaft portion 6, the shaft portion 6 has air channels 11 arranged in overlap with the air channels 8.

Figure 2:
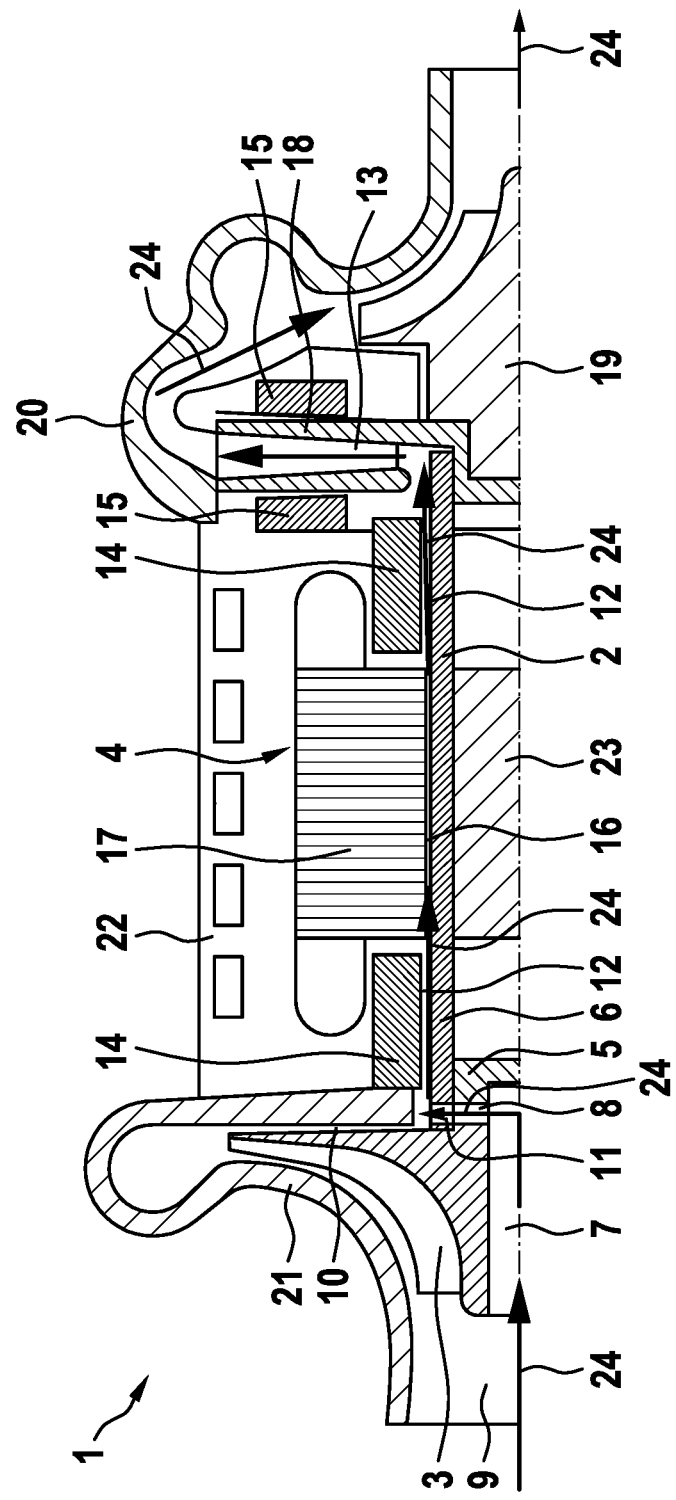
FIG. 2 shows a schematic longitudinal section through the turbomachine of FIG. 1 with an illustration of the air routing.

As can also be seen from FIG. 2, the turbomachine 1 illustrated has further air channels 12, 13. The air channels 12, 13 connect the annular space 10 to at least one bearing 14, 15. In the present case, at least one axially running air channel 12 leads from the annular space 10 via the radial bearings 14 from the compressor side to the turbine side of the turbomachine 1, with the result that cooling of the radial bearings 14 is effected by means of the air supplied. In this case, the at least one air channel 12 is routed via an annular gap 16 between the winding 17 and the shaft 2, with the result that cooling of the electric motor 4 is also achieved. At the turbine-side end of the shaft 2, the at least one air channel 12 is connected to at least one radially running air channel 13, which extends through the axial bearing disk 18 from radially inside to radially outside. Thus, not only is cooling of the axial bearings 15 achieved, but also an increase in the air pressure to the level upstream of the turbine wheel 19. The air flow 24 passing through the air channels 7, 8, 12, 13 is indicated by arrows in FIG. 2.

The invention claimed is:

1. A turbomachine (1) for supplying air, the turbomachine comprising at least one compressor wheel (3) connected to a shaft (2) for conjoint rotation therewith, and an electric motor (4) for driving the shaft (2), wherein the at least one compressor wheel (3) is connected via a hub portion (5) to a shaft portion (6) of the shaft (2) for conjoint rotation therewith, wherein at least one air channel (7, 8) is formed in the hub portion (5), wherein the at least one air channel connects a compressor inlet (9) to an annular space (10) on a side of the at least one compressor wheel (3) facing away from the compressor inlet (9), thus ensuring that an air pressure of substantially equal value is present on the side of the at least one compressor wheel (3) facing away from the compressor inlet (9) and a side of the at least one compressor wheel (3) facing towards the compressor inlet (9), wherein the annular space (10) is connected to at least one bearing (14, 15) of the shaft (2) on the side of the at least one compressor wheel (3) facing away from the compressor inlet (9) via at least one further air channel (12, 13), and wherein the at least one further air channel (12) extends through the at least one bearing (14,15) and through an annular gap (16) formed between the shaft (2) and a winding (17) of the electric motor (4) surrounding the shaft (2), such that air flow through the at least one further air channel (12) and through the annular gap (16) cools the at least one bearing (14, 15) and the electric motor (4);
- wherein the at least one air channel includes a radially running portion (8) in the hub portion (5); and
- wherein the shaft portion (6) has at least one substantially radially running air channel (11), which is arranged in overlap with the radially running portion (8) of the at least one air channel of the hub portion (5).

2. The turbomachine (1) as claimed in claim 1, wherein the at least one air channel includes an axially running portion (7) in the hub portion (5).

3. The turbomachine (1) as claimed in claim 1, wherein the hub portion (5) is inserted at least partially into the shaft portion (6).

4. The turbomachine (1) as claimed in claim 1, wherein the at least one further air channel (13) is routed through an internally ventilated axial bearing disk (18), the internally ventilated axial bearing disk (18) is connected to the shaft (2) for conjoint rotation therewith, and for supporting a turbine wheel (19).

5. The turbomachine (1) as claimed in claim 1, wherein the at least one air channel (7, 8) and the at least one further air channel (12, 13), which form a connection with the compressor inlet (9), can be supplied with cooled or uncooled ambient air.

6. A method for operating the turbomachine (1) as claimed in claim 1, wherein the at least one air channel (7, 8) and the at least one further air channel (12, 13) are supplied with cooled or uncooled ambient air.

7. The method as claimed in claim 6, wherein an air pressure of the cooled or uncooled ambient air is raised with aid of an internally ventilated axial bearing disk (18), through which the at least one further air channel (13) is routed.

8. The turbomachine (1) as claimed in claim 1, wherein the shaft portion (6) of the shaft (2) is hollow-cylinder-shaped.

9. The turbomachine (1) as claimed in claim 8, wherein the at least one air channel includes an axially running portion (7) in the hub portion (5).

10. The turbomachine (1) as claimed in claim 8, wherein the hub portion (5) is pressed at least partially into the hollow-cylinder-shaped shaft portion (6).

11. The turbomachine (1) as claimed in claim 1, wherein the at least one bearing (14, 15) is configured as a foil air bearing.

12. The turbomachine (1) as claimed in claim 11, wherein the at least one further air channel (13) is routed through an internally ventilated axial bearing disk (18), the internally ventilated axial bearing disk (18) is connected to the shaft (2) for conjoint rotation therewith, and for supporting a turbine wheel (19).

13. The turbomachine (1) as claimed in claim 12, wherein the at least one air channel (7, 8) and the at least one further air channel (12, 13), which form a connection with the compressor inlet (9) can be supplied with cooled or uncooled ambient air.

14. A turbomachine (1) for supplying air, the turbomachine comprising at least one compressor wheel (3) connected to a shaft (2) for conjoint rotation therewith, and an electric motor (4) for driving the shaft (2), wherein the at least one compressor wheel (3) is connected via a hub portion (5) to a shaft portion (6) of the shaft (2) for conjoint rotation therewith, wherein at least one air channel (7, 8) is formed in the hub portion (5), wherein the at least one air channel connects a compressor inlet (9) to an annular space (10) on a side of the at least one compressor wheel (3) facing away from the compressor inlet (9), thus ensuring that an air pressure of substantially equal value is present on the side of the at least one compressor wheel (3) facing away from the compressor inlet (9) and a side of the at least one compressor wheel (3) facing towards the compressor inlet (9), wherein the annular space (10) is connected to at least one bearing (14, 15) of the shaft (2) on the side of the at least one compressor wheel (3) facing away from the compressor inlet (9) via at least one further air channel (12, 13), and wherein the at least one further air channel (12) extends through the at least one bearing (14,15) and through an annular gap (16) formed between the shaft (2) and a winding (17) of the electric motor (4) surrounding the shaft (2), such that air flow through the at least one further air channel (12) and through the annular gap (16) cools the at least one bearing (14, 15) and the electric motor (4):
- wherein the shaft portion (6) of the shaft (2) is hollow-cylinder-shaped;
- wherein the at least one air channel includes an axially running portion (7) in the hub portion (5);
- wherein the at least one air channel includes a radially running portion (8) in the hub portion (5); and
- wherein the hub portion (5) is pressed at least partially into the hollow-cylinder-shaped shaft portion (6).

15. The turbomachine (1) as claimed in claim 14, wherein the hollow-cylinder-shaped shaft portion (6) has at least one substantially radially running air channel (11), which is arranged in overlap with the radially running portion (8) of the at least one air channel of the hub portion (5).

16. The turbomachine (1) as claimed in claim 15, wherein the at least one bearing (14, 15) is configured as a foil air bearing.

17. The turbomachine (1) as claimed in claim 16, wherein the at least one further air channel (13) is routed through an internally ventilated axial bearing disk (18), the internally ventilated axial bearing disk (18) is connected to the shaft (2) for conjoint rotation therewith, and for supporting a turbine wheel (19).

18. The turbomachine (1) as claimed in claim 17, wherein the at least one air channel (7, 8) and the at least one further air channel (12, 13), which form a connection with the compressor inlet (9) can be supplied with cooled or uncooled ambient air.

* * * * *